United States Patent Office 2,843,572
Patented July 15, 1958

2,843,572

PREPARATION OF VINYLIDENE CHLORIDE INTERPOLYMERS OF IMPROVED SOLUBILITY

Willis C. Wooten, Jr., and Donald J. Shields, Kingsport, Tenn., assignors to Eastman Kodak Company, Rochester, N. Y., a corporation of New Jersey No Drawing. Application December 30, 1954
Serial No. 478,885

7 Claims. (Cl. 260—85.5)

This invention relates to the preparation of interpolymers of vinylidene chloride and at least one other ethenoid monomer and is particularly concerned with continuous processes for preparing vinylidene chloride interpolymers which are more readily soluble than the corresponding interpolymers prepared by other methods and which, in some cases, exhibit acetone solubility.

Vinyl chloride can be homopolymerized to give polymers which are soluble in organic solvents such as dioxane, cyclohexanone, dimethyl formamide, and the like. The homopolymer is relatively low softening and fusible and has a low degree of crystallinity. Furthermore, copolymers of vinyl chloride with other monomers are ordinarily more soluble than the homopolymer of such other monomer alone. Thus, for example, vinyl chloride polymers are more readily soluble than polyacrylonitrile, and, as expected, copolymers of vinyl chloride and acrylonitrile are more soluble than polyacrylonitrile itself.

In contrast to this, polyvinylidene chloride is an infusible homopolymer which is not soluble at room temperature in any known organic solvents. At much higher temperatures, the homopolymer of vinylidene chloride is soluble only in certain solvents such as diphenyl ether. The homopolymer is highly crystalline and is very intractable and difficult to process. Thus, vinylidene chloride would be expected to give interpolymers which would be more insoluble than the homopolymers of the material employed in the interpolymerization with the vinylidene chloride. For example, since polyvinylidene chloride is more insoluble than polyacrylonitrile, it would be expected that a copolymer of vinylidene chloride and acrylonitrile would be less soluble than polyacrylonitrile itself.

For use in many applications and particularly in the spinning of synthetic fibers, it is very desirable to employ a polymeric material which can be readily dissolved in an available organic solvent to form a spinning dope which can be wet or dry spun using the ordinary spinning techniques. Heretofore, it has been difficult to employ vinylidene chloride polymers in fiber applications because of this insolubility difficulty.

Various methods have been proposed for increasing the solubility of vinylidene chloride polymers. One of the methods most widely employed heretofore has been to carry the polymerization only to a conversion of 50-70% with a limited range of proportions of the vinylidene chloride and other monomer in order to achieve any satisfactory degree of solubility. It is apparent that carrying out a process to such a low degree of conversion is highly inefficient from the commercial standpoint and consequently is undesirable in plant practice. It is therefore desirable to provide some method of preparing vinylidene chloride interpolymers of improved solubility characteristics by methods which are readily adaptable to commercial practice. If possible, it is desirable to obtain vinylidene chloride interpolymers which are readily soluble in such common organic solvents as acetone whereby the problems of preparation of spinning dopes and recovery of solvent can be effected in accordance with well known practice.

It is accordingly an object of this invention to provide new and improved vinylidene chloride interpolymers having greatly improved solubility characteristics. It is another object of the invention to prepare vinylidene chloride interpolymers by a continuous process which is highly efficient for commercial operations and which yields vinylidene chloride interpolymers at high conversion efficiencies but with excellent solubility characteristics in many of the common organic solvents. Another object of the invention is to provide copolymers of vinylidene chloride with acrylonitrile or methacrylonitrile over a wide composition range, and preferably in a form which is readily soluble in acetone. A further object of the invention is to provide acetone solutions of vinylidene chloride interpolymers which can be readily employed for the spinning of synthetic fibers of excellent mechanical and chemical characteristics. Other objects will be apparent from the description and claims which follow.

We have found that quite unexpectedly vinylidene chloride can be interpolymerized with at least one other monoethenoid monomer by a continuous process embodying this invention as described hereinafter to give interpolymers which have greatly improved solubility characteristics in many of the common organic solvents. Thus improved interpolymers can be prepared over the range of 5 to 95% by weight of vinylidene chloride with 95 to 5% by weight of such other monoethenoid monomer. In the preferred embodiment of the invention, acetone-soluble interpolymers can be readily prepared and employed for wet or dry spinning from acetone spinning dopes using conventional spinning techniques and equipment in accordance with well known practice already being employed with such materials as cellulose triacetate. The polymers embodying this invention show an improved solubility in many of the organic solvents and hence polymers of controlled solubility characteristics can be readily prepared according to a predetermined plan. These polymers are prepared by a continuous equilibrium or steady-state process wherein essentially uniform interpolymers are continuously produced and withdrawn without change in the relative proportions of any of the ingredients of the polymerization mixture at either high, low or intermediate conversions for any desired ratio of the polymerization reactants within the range of 5–95% by weight of vinylidene chloride and 95–5% by weight of at least one other monoethylenically unsaturated polymerizable monomer.

In practicing the invention, the reactants employed are usually the same as are used in corresponding batch reactions and include the monomers being interpolymerized, polymerization catalyst, and polymerization medium, with or without the concomitant use of activators, emulsifying agents, chain regulators, and such other adjuvants as are commonly employed in polymerization practice. The various reactants and adjuvants are all continuously and progressively added to the polymerization system at controlled rates and in predetermined proportions depending upon the polymer composition desired. Polymerization in each increment of additive begins at once. When the continuous process is initiated, all of the components are added simultaneously and continuously at a specific rate which is thereafter maintained. The process can be carried out in any of the commonly employed polymerization equipment, although it is entirely feasible to employ smaller reactors than would be necessary with the corresponding batch polymerizations. The reactors can be charged initially with the polymerization mixture in the desired proportions, and the polymerization can be carried out until the desired degree of conversion has been obtained, whereupon reactants are then continuously added and a dispersion of interpolymer is continuously withdrawn from the system. Alternatively, the initial stages of the process can be effected by continuously adding the various components of the polymerization mixture without withdrawing product until the volume of the polymerization mixture has been built up to the desired capacity. The time which elapses between the addition of any increment of the reaction components and the withdrawal of that same increment from the polymerization zone in the form of polymeric product is defined as the contact time and can be varied as desired depending upon the degree of conversion and the molecular weight of product desired. Product is continuously and progressively withdrawn from the polymerization system in the form of an emulsion at a rate corresponding to the total rate of addition of the reaction components. Throughout the polymerization, the conditions are maintained constant, and the concentrations of components are also maintained constant, whereby each increment of the polymerization mixture is present in the polymerization zone under identical reaction conditions and for exactly the same time as any other increment. Since all of the components of the reaction mixture, including catalyst and polymerization medium as well as the monomers, are being continuously added, the relative concentrations in the system do not change, and the entire polymerization proceeds at equilibrium or in a steady state, and the product does not vary to any appreciable extent regardless of the length of time the process is carried on. One of the outstanding and unique features of this continuous equilibrium process is that differences in monomer polymerization rates have no effect whatever on the choice of polymer compositions or the uniformity of such polymer compositions. The monomer polymerization rates affect only the relationship of polymer composition to monomer feed rates at equilizrium; and, since the monomer feed rates can be adjusted to any desired value, polymer of any desired composition can be formed regardless of the relative polymerization rates of the monomers. Furthermore, the composition of the polymeric product can be controlled within close limitation since the interpolymer composition obtained from any given ratio of the monomers will correspond within 5% to the monomer ratio.

Unexpectedly, the vinylidene chloride interpolymers prepared by the continuous process embodying the invention have greatly improved solubility characteristics, even at high conversions where the batch process polymers are poorly soluble, if soluble at all, in many of the common organic solvents. Furthermore, even at low conversions of the order of 50–70% where batch process polymers have somewhat improved solubility, the interpolymers produced in accordance with this invention are superior in physical properties. This improved solubility is particularly apparent when interpolymers are prepared of 25–65% by weight of vinylidene chloride with 75–35% by weight of acrylonitrile or of 5–25% by weight of vinylidene chloride with 95–75% by weight of methacrylonitrile. These copolymers are particularly useful in fiber-forming applications and possess acetone solubility at room temperature so that spinning dopes containing as much as 20% or more solids content can be readily prepared and employed in the manufacture of highly useful synthetic fibers. In the process embodying this invention, it is thus not necessary to confine the conversion to any particular efficiency range, nor is it necessary to carry out the reaction at any particular controlled temperature or to add the various monomers at differing rates. Instead, the present process can be readily effected for prolonged periods of time merely by maintaining the polymerization temperature constant and by controlling the rates of addition of the various components and the rate of withdrawal of product throughout the polymerization.

Batch processes, aside from the inherent disadvantages with regard to equipment, man power, etc., exhibit an induction period before polymer formation is evidenced, particularly in free radical catalyst polymerizations. This induction period usually varies, even under carefully controlled conditions, and affects the molecular weight distribution of the polymer and hence the physical and chemical properties of the polymer. In contrast to this, the polymerization embodying this invention can be carried out without any appreciable induction period for each increment of the mixture being added. Another disadvantage of the batch processes is the rapid evolution of heat by the large quantities of reactants which must be used. This makes it almost impossible, even with efficient cooling, to hold a constant temperature during the course of the polymerization. In large scale commercial production, this imposes a limit on the speed with which the polymerization can be carried out. When temperature control is inadequate, the polymer uniformity varies, and in some cases part of the polymer may actually precipitate from the polymerization medium. In any case, a nonhomogeneous composition distribution results, and the highly uniform polymers which have been found to possess improved solubility characteristics are not obtained. In the processes embodying this invention, the volume of reactants employed can be maintained at a minimum since the preparation of product depends upon the absolute rates of addition of components and withdrawal of product. Consequently, it is possible to effect close temperature control during the polymerization whereby each increment of the polymerization mixture is maintained under polymerization conditions which are substantially unchanged from those obtaining during the polymerization of all other increments of the polymerization mixture.

Since all of the reaction components are being continuously and progressively added to the polymerization mixture at constant rates and in predetermined ratios, the relative proportions of the reaction components remain constant throughout the polymerization. This leads to the formation of very highly uniform polymers which cannot be obtained by the usual batch processes. In batch processes, the monomers employed usually vary somewhat in reactivity and rate of polymerization. Consequently, the relative proportions of the reactants is constantly changing during the polymerization, and the composition distribution of the product is also changing. The first polymer formed tends to be relatively rich in the more reactive component, and later polymer is progressively richer in the less reactive component. This, of course, results in nonuniform product and is particularly serious when one of the components is employed in a relatively small amount. Furthermore, in the usual polymerization practice, the various other components of the reaction mixture besides the monomers are not usually added during the course of the reaction and hence the concentration of such other ingredients also varies during the polymerization. Because of this, the molecular weight of the polymer being formed in batch processes varies throughout the course of the polymerization.

The interpolymerization embodying this invention is desirably effected between vinylidene chloride and acrylonitrile or methacrylonitrile in most cases because of the excellent utility of the resulting copolymers in fiber applications. The invention is also applicable, however, to the preparation of other interpolymers of vinylidene chloride and other monoethylenically unsaturated polymerizable monomers. Thus, the vinylidene chloride can be copolymerized or interpolymerized with one or more of such other monoethenoid polymerizable monomers as the acrylamides, methacrylamides, fumaramides, citraconamides, vinyl pyridines, styrene, itaconamides, maleamates, fumaramates, itaconamates, citraconamates, vinyl esters, substituted styrenes, polymerizable unsaturated acids, vinylic ketones, vinylic ethers, and similar well known polymerizable monomers containing a single ethylenic unsaturation. Such monoethenoid monomers are well known in the polymer art, and the invention will not be limited to any particular monomer since any of such monomers can be employed. Thus, for example, typical monomers which are suitably employed include acrylamide, N-methyl methacrylamide, N-isopropyl acrylamide, vinyl acetate, vinyl chloride, styrene, butyl acrylate, methyl acrylate, methyl methacrylate, N-methyl fumaramide, N-methyl maleamate, N-methyl citraconamate, α-methyl styrene, methyl vinyl ketone, ethyl vinyl ketone, isopropenyl acetate, 2-methyl-5-vinyl pyridine, 2-vinyl pyridine, acrylonitrile, α-acetoxy acrylonitrile, ethylene, acrylic acid, methacrylic acid, and similar well known monoethenoid monomers of which those enumerated are merely illustrative.

The continuous process of this invention is desirably carried out in aqueous medium but can be advantageously carried out in other reaction media in some cases, such as in organic solvents or mixtures of water with a water-soluble organic solvent such as acetone. Anhydrous solvents which are suitable include acetonitrile, benzene, toluene, liquid alkanes such as n-heptane and the like, aliphatic ethers, acetone, and similar well known solvents. The polymerization is effected in a dispersion, and, as used herein, the term "dispersion" is intended to include both true solutions and emulsions. The processes embodying the invention are particularly suitable for preparing interpolymers of vinylidene chloride with acrylonitrile or methacrylonitrile. Such polymers are particularly useful for making synthetic fibers, and the polymers containing from 30 to 65% by weight of vinylidene chloride and 70 to 35% by weight of acrylonitrile are particularly useful. The interpolymers prepared in accordance with this invention are not only characterized by a high degree of solubility, but also are useful in forming compatible mixtures with other homopolymers or copolymers. Thus, the interpolymers of this invention can be used in conjunction with polyacrylonitrile but are preferably used in conjunction with a homopolymer or copolymer of an acrylamidic monomer such as N-isopropyl acrylamide or N-methyl methacrylamide.

The polymerization is accelerated by heat, by actinic light such as ultraviolet light, and by polymerization catalysts. Such polymerization catalysts are commonly used in the art, and our invention is not to be limited to any particular catalyst material. Catalysts which are especially useful are the peroxy polymerization catalysts such as the organic peroxides, alkyl percarbonates, hydrogen peroxide, perborates, persulfates, and the like. Typical of these peroxy catalysts are such materials as benzoyl peroxide, acetyl peroxide, acetyl benzoyl peroxide, lauryl peroxide, oleoyl peroxide, triacetone peroxide, urea peroxide, t-butyl hydroperoxide, sodium and potassium perborates, ammonium perborate, sodium persulfate, potassium persulfate, ammonium persulfate, and the like. Other catalysts such as the ketazines, azines, etc. can also be used as well as mixtures of any of these or similar catalysts. The amount of catalyst can be varied depending upon the monomers, amount of diluent, and similar variable factors. The temperature at which the continuous polymerizations are carried out is not critical, although temperatures of from 15° to 75° C. are generally employed.

If desired, emulsifying agents can be added to the reaction mixture to uniformly distribute the reactants throughout the reaction medium. In the preferred practice, the emulsifying agent and activator, if any, are desirably added in aqueous dispersion whereby a portion of the polymerization medium is continuously added in this fashion. Typical emulsifying agents which are suitable include the alkali metal salts of certain alkyl acid sulfates, such as sodium lauryl sulfate; the alkali metal salts of aromatic sulfonic acids, such as sodium isobutyl naphthalene sulfonate; the alkali metal or amine addition salts of sulfosuccinic acid esters; the alkali metal salts of fatty acids containing from 12 to 20 carbon atoms; sulfonated fatty acid amides; alkali metal salts of alkane sulfonic acids, sulfonated ethers, such as acyloxy polyalkylene ether sulfonates, and the like. The polymerization is advantageously carried out also in the presence of chain regulators such as hexyl, octyl, lauryl, dodecyl, or myristyl mercaptans which impart solubility properties to the polymer compositions. If desired, an activating agent such as an alkali metal sulfite, bisulfite, or metabisulfite can be added in about the same amount as the polymerization catalyst.

In effecting the continuous process of the invention, the monomers, catalyst, activator, if any, polymerization medium, and the like can be stored separately and introduced separately but continuously into the polymerization system, or certain of the reaction components can be added in the form of premixtures. The polymerization can be carried out in a stirred reactor of the type usually employed for batch processing but provided with an overflow conduit for continuously withdrawing polymer emulsion or slurry from the reaction zone; or a simple pipe reactor can be employed. If desired, the monomers employed can be premixed in the desired ratio and continuously fed to the reaction zone. Usually, the catalyst and the activator, if any, are dissolved in aqueous medium in a concentration whereby the addition of the solution or solutions gives the desired volume of polymerization medium and the desired concentration of catalyst and activator. The polymerization can be carried out in several successive stages, but best results from the standpoint of uniformity and solubility of the product are obtained using but a single reaction stage.

The practice of the invention is illustrated by the following examples, it being understood that the process is equally applicable to the manufacture of any of the other vinylidene chloride interpolymers as defined herein. Since the nature and proportions of the reactants do not change the reaction conditions as described, the invention is not limited by the examples unless otherwise specifically indicated.

*Example 1*

In a typical continuous process embodying the invention, acrylonitrile, vinylidene chloride, a 1% aqueous solution of potassium persulfate, and a solution of 1 part by weight of dioctyl sodium sulfosuccinate and 0.1 part by weight of potassium metabisulfite in 102 parts of water were added continuously and separately from storage tanks into a suitable reactor at such rates that the relative ratios by weight of the materials were 1 part acrylonitrile:1 part vinylidene chloride:0.5 potassium persulfate solution and 12.0 parts of the emulsifying agent and activator solution respectively. The resulting admixture was agitated vigorously while the temperature was maintained constant at 25° C. Polymerization ensued almost immediately. The volume of the reactor divided by the rate of introduction of the reactants determined the contact time of each increment in the polymerizing zone. The contact time can, of course, be varied infinitely, but an especially useful period was 6 hours, at which time titration for residual acrylonitrile monomer indicated that a conversion to polymer of 90% had occurred. When substantially complete conversion is indicated herein, conversions of about 90 to 100% are intended. At equilibrium, the polymer emulsion or slurry was continuously and progressively removed from the reactor at the same total rate at which the ingredients were being added. In this way, the contact time was conveniently controlled by the absolute rate of addition of the reactants. The resultant emulsion which was removed continuously was then treated in the usual manner to isolate the polymer. The isolation of polymer can be effected in any desired manner with a particularly convenient method being to salt out the polymer from the emulsion and filter it off. The isolated polymer obtained in accordance with this process was soluble in acetone and was readily dry spun into a fiber which had a tenacity of 3 grams per denier and a softening point of 190° C. Spinning dopes in acetone having 15–20% solids were readily prepared, and the dopes remained stable at room temperature.

Improved solubilities in various solvents were obtained with any of the compositions within the ranges herein defined. Acetone solubility was obtained with vinylidene chloride-acrylonitrile copolymers when the copolymer contained 25–65% by weight of vinylidene chloride. In the remainder of the range from 5 to 95% by weight of vinylidene chloride, improved solubility in such other solvents as dimethyl formamide, dimethyl acetamide, and similar solvents was evident.

Example 2

Methacrylonitrile (A), vinylidene chloride (B), a 1% aqueous solution of potassium persulfate (C), and a solution of 1 part of dioctyl sodium sulfosuccinate and 0.1 part of potassium metabisulfite in 102 parts of water (D) were continuously and progressively charged into a reactor in a ratio of 1.0A:1.0B:0.5C:12.0D, based on the weights of A, B, C and D. The polymerization was effected with vigorous agitation at a temperature maintained constant at 25° C. The contact time for each increment of polymerization mixture was about 6 hours with a conversion efficiency of about 90%. The resulting emulsion of methacrylonitrile-vinylidene chloride copolymer was continuously withdrawn from the reactor at a rate equivalent to the total rate of addition of the components A–D. The polymer was isolated from the emulsion and dissolved in acetone, in which it had excellent solubility. The resulting acetone solution was dry spun into fibers by the usual techniques, and the fibers thereby obtained had a tenacity of 2 grams per denier and an extensibility of 20%.

Example 3

A polymerization mixture was continuously prepared by adding to a reactor 0.6 part by weight of vinylidene chloride, 1.4 parts by weight of vinyl chloride, 0.5 part by weight of a 1% aqueous solution of potassium persulfate and 12.0 parts by weight of a solution of 1 part by weight of sodium octyl sulfate and 0.1 part by weight of potassium metabisulfite in 102 parts by weight of water, the rate of addition of the various components being regulated to give a contact time of about 24 hours. The polymerization was agitated vigorously, and the reaction temperature was held constant at 25° C. During the continuous addition of components to the reaction zone, a polymer emulsion was continuously removed from the reactor and the polymer was isolated by the usual methods. The resulting vinyl chloride-vinylidene chloride copolymer was soluble in acetone and was dry spun into fibers which, after drafting, releasing and stabilization, had a tenacity of 2.2 grams per denier and an extensibility of 22%.

Example 4

Polymerization was effected in a steady-state process by the continuous and progressive bringing together of 1 part by weight of acrylonitrile, 1 part by weight of vinylidene chloride, 1 part by weight of a 1% aqueous solution of potassium persulfate and 12.0 parts by weight of a solution of 1 part by weight of sodium octyl sulfate and 0.1 part by weight of potassium metabisulfite in 100 parts of water. The polymerization mixture was agitated vigorously throughout the polymerization with the temperature maintained constant at 25° C. The contact time for each increment of polymerization mixture was about 6 hours, at which time titration for residual acrylonitrile indicated that a conversion to polymer of 90% had occurred. The resultant copolymer emulsion was continuously removed at the same rate at which the various components were being added. The polymer was then precipitated from the emulsion and isolated to give an acetone soluble material which was readily spun into fibers having high tenacity, extensibility, and softening point.

Example 5

Vinyl chloride, vinylidene chloride, a 1% aqueous solution of potassium persulfate, and a solution of 1 part by weight of sodium octyl sulfate and 0.1 part by weight of potassium metabisulfite in 102 parts by weight of water were continuously and progressively admixed in a ratio by weight of 1.2 parts by weight of vinyl chloride, 0.8 part by weight of vinylidene chloride, 1.0 part by weight of potassium persulfate solution, and 12.0 parts by weight of the solution of emulsifying agent and activator. The resulting polymerization mixture was agitated vigorously at a temperature of 25° C. The contact time was 24 hours, at which time a conversion to polymer of about 90% had occurred. The vinyl chloride-vinylidene chloride copolymer emulsion was continuously removed from the reactor at the same rate at which the various components were being added to the reactor. The resulting copolymer was extremely uniform in composition and was readily soluble in acetone to give smooth spinning dopes having a solids content of 15–20%.

Similarly improved interpolymers are prepared with other ratios of these various monomers as well as these or other ratios of vinylidene chloride with such other monomers as the vinyl esters, acrylamides, acrylates, styrene, and similar well known monoethenoid monomers.

The copolymers of this invention can be used directly for the preparation of fibers, films, and the like, or they can be admixed with other polymeric materials. The exact reason for the greatly improved solubilities of the polymers prepared in accordance with this invention is not clearly apparent since the solubility is very much greater than would be expected from either of the individual components. The improved properties would appear to be a function of the unusual uniformity of the polymer from the standpoint both of composition distribution and molecular weight distribution, although the corresponding homopolymers which are completely uniform are themselves much less soluble. Although the preferred polymers are soluble in acetone at room temperature, the invention is not limited to acetone-soluble polymers since improved solubility in other well known solvents such as N,N-dimethyl formamide, N,N-dimethyl acetamide, γ-butyrolactone, alcohols, aromatic hydrocarbons, and the like characterizes all of the products produced in accordance with the invention. Thus, for example, spinning dopes can be used wherein the solvent is a mixture of acetone and another solvent or wherein a single organic solvent other than acetone is employed with excellent results.

The polymers prepared in accordance with the invention are of particular utility for the manufacture of textile fibers, but such polymers also find utility in the manufacture of cast or extruded sheets, films, ribbons, and the like. In film form, the polymers can be employed in photographic applications such as in the manufacture of film base for carrying photosensitive emulsions, such as silver halide emulsions. The copolymer films can be used in the manufacture of either black-and-white or color photographic film. Because of their excellent compatibility, the copolymers of the invention can be used in mechanical mixtures with other polymeric materials to give improved dyeability characteristics. The excellent solubility characteristics of the interpolymers of this invention makes the preparation of cast films possible in commercial production.

When the invention is employed in commercial practice, it is desirable to carry out the continuous process for prolonged periods of time with continuous withdrawal of product. Since the least uniform polymer is obtained during the initial contact time before continuous withdrawal of product is begun, the process is desirably carried forward for a substantial period beyond the initial contact time. In some cases, however, when employing large volume equipment or preparing relatively small batches of polymer, it may be desirable to stop the polymerization when the reactor capacity is reached, and this can be done with somewhat less advantageous results, particularly when the contact time is such that the conversion is substantially complete. In addition to the improved solubility characteristics of the products derived by means of the invention, certain other advantages are present in the continuous process as described. The process can be run with a completely filled system whereby all traces of oxygen are eliminated. Futhermore, the induction period and non-reproducibility of such variables as rate of reaction, inherent viscosity of polymers, molecular weight distribution, and the like are also eliminated. Since only a relatively small quantity of monomer is polymerizing at any time, the heat of reaction can be readily dissipated. Consequently, faster polymerization rates can be used, and the temperature can be controlled within narrow limits whereby polymers of increased uniformity are obtained. Thus, by means of this invention, the disadvantages inherent in processes employed prior hereto are largely obviated. Furthermore, the products thus obtained possess unexpectedly good solubility characteristics over a wide composition range and using a great variety of monoethenoid monomers for interpolymerization with the vinylidene chloride.

Although the invention has been described in detail with particular reference to certain preferred embodiments thereof, variations and modifications can be effected within the spirit and scope of the invention as described hereinabove and as defined in the appended claims.

We claim:

1. The process for producing interpolymers consisting essentially of 5–95% by weight of vinylidene chloride and 95–5% by weight of one different polymerizable monoethylenic monomer, characterized by improved solubility characteristics, which consists in continuously and progressively introducing into a single polymerizing zone under polymerizing conditions incremental portions of (1) monoethenoid monomeric material consisting of vinylidene chloride and a different monomer from the group consisting of acrylonitrile and methacrylonitrile, (2) an aqueous polymerization medium and (3) polymerization catalyst, maintaining each increment of the resulting admixture in said polymerizing zone, while maintaining said polymerizing conditions substantially unchanged, for a time sufficient to effect substantial interpolymerization of said vinylidene chloride and said different monomer, and continuously and progessively withdrawing a dispersion of interpolymer product from said polymerization zone at a rate correlated to the total rate of addition of (1), (2) and (3) whereby the admixture in said polymerizing zone remains substantially unchanged in composition during said continuous introducing of (1), (2) and (3) and said continuous withdrawing of product, said continuous and progressive introducing of each of (1), (2) and (3) being continued at a constant rate substantially throughout the polymerization, said vinylidene chloride and said different monomer being introduced in a constant ratio within the range of 5 to 95% by weight of said vinylidene chloride and from 95 to 5% by weight of said different monomer.

2. The process for producing acetone-soluble interpolymers consisting essentially of vinylidene chloride and acrylonitrile which consists in continuously and progressively bringing together in a single polymerizing zone at a temperature of 15–75° C. incremental portions of vinylidene chloride, acrylonitrile and an aqueous solution of a peroxy polymerization catalyst, maintaining each increment of the resulting mixture in said polymerizing zone, while maintaining said temperature substantially unchanged, for a time sufficient to effect substantial interpolymerization of said vinylidene chloride and said acrylonitrile, and continuously and progressively withdrawing a dispersion of the resulting interpolymer product from said polymerizing zone at a rate equivalent to the total rate of addition of said vinylidene chloride, acrylonitrile and aqueous solution being added whereby the mixture in said polymerizing zone remains substantially unchanged in composition during said continuous bringing together and said continuous wthdrawing, said continuous and progressive bringing together being continued at a constant rate substantially throughout said continuous withdrawing, said vinylidene chloride and said acrylonitrile being brought together at a constant ratio within the range of from about 25 to 65% by weight of vinylidene chloride to about 75 to 35% by weight of acrylonitrile.

3. The process for producing acetone-soluble interpolymers consisting essentially of vinylidene chloride and methacrylonitrile which consists in continuously and progressively bringing together in a single polymerizing zone at a temperature of 15–75° C. incremental portions of vinylidene chloride, methacrylonitrile and an aqueous solution of a peroxy polymerization catalyst, maintaining each increment of the resulting mixture in said polymerizing zone, while maintaining said temperature substantially unchanged, for a time sufficient to effect substantial interpolymerization of said vinylidene chloride and said methacrylonitrile, and continuously and progressively withdrawing a dispersion of the resulting interpolymer product from said polymerizing zone at a rate equivalent to the total rate of addition of said vinylidene chloride, methacrylonitrile and aqueous solution being added whereby the mixture in said polymerizing zone remains substantially unchanged in composition during said continuous bringing together and said continuous withdrawing, said continuous and progressive bringing together being continued at a constant rate substantially throughout said continuous withdrawing, said vinylidene chloride and said methacrylonitrile being brought together at a constant ratio within the range of from about 5 to 25% by weight of said vinylidene chloride to about 95 to 75% by weight of said methacrylonitrile.

4. The process for producing an acetone-soluble interpolymer consisting essentially of vinylidene chloride and acrylonitrile which consists in continuously and progressively bringing together in a single polymerizing zone at a temperature of 15–75° C. incremental portions of vinylidene chloride, acrylonitrile, an aqueous solution of a peroxy polymerization catalyst and an aqueous dispersion of an emulsifying agent and a polymerization activator, maintaining each increment of the resulting mixture in said polymerizing zone, while maintaining said temperature substantially unchanged, for a time sufficient to substantially complete interpolymerization of said vinylidene chloride and said acrylonitrile, and continuously and progressively withdrawing from said polymerizing zone an aqueous dispersion of the resulting interpolymer product at a rate equivalent to the total rate of addition of said vinylidene chloride, said acrylonitrile, said aqueous solution and said aqueous dispersion being continuously introduced into said polymerizing zone whereby the mixture in said polymerizing zone remains substantially unchanged in composition during said continuous bringing together and said continuous withdrawing, said continuous and progressive bringing together being continued at a constant rate substantially throughout said continuous withdrawing, said vinylidene chloride and said acrylonitrile being introduced into said polymerizing zone at a constant ratio within the range of from about 25 to 65% by weight of vinylidene chloride to about 75 to 35% by weight of acrylonitrile.

5. The process for producing an acetone-soluble interpolymer consisting essentially of vinylidene chloride and methacrylonitrile which consists in continuously and progressively bringing together in a single polymerizing zone at a temperature of 15–75° C. incremental portions of vinylidene chloride, methacrylonitrile, an aqueous solution of a peroxy polymerization catalyst and an aqueous dispersion of an emulsifying agent and a polymerization activator, maintaining each increment of the resulting mixture in said polymerizing zone, while maintaining said temperature substantially unchanged, for a time sufficient to substantially complete interpolymerization of said vinylide chloride and said methacrylonitrile, and continuously and progressively withdrawing from said polymerizing zone an aqueous dispersion of the resulting interpolymer product at a rate equivalent to the total rate of addition of said vinylidene chloride, said methacrylonitrile, said aqueous solution and said aqueous dispersion being continuously introduced into said polymerizing zone whereby the mixture in said polymerizing zone remains substantially unchanged in composition during said continuous bringing together and said continuous withdrawing, said continuous and progressive bringing together being continued at a constant rate substantially throughout said continuous withdrawing, said vinylidene chloride and said methacrylonitrile being introduced into said polymerizing zone at a constant ratio within the range of from about 5 to 25% by weight of vinylidene chloride to about 95 to 75% by weight of methacrylonitrile.

6. An acetone solution of a vinylidene chloride-acrylonitrile interpolymer produced according to the process of claim 4.

7. An acetone solution of a vinylidene chloride-methacrylonitrile interpolymer produced according to the process of claim 5.

References Cited in the file of this patent

UNITED STATES PATENTS

| | | |
|---|---|---|
| 2,238,020 | Hanson et al. | Apr. 8, 1941 |
| 2,462,422 | Plambeck | Feb. 22, 1949 |
| 2,496,384 | De Nie | Feb. 7, 1950 |